United States Patent [19]

Takeda et al.

[11] Patent Number: 4,639,803
[45] Date of Patent: Jan. 27, 1987

[54] THIN FILM MAGNETIC HEAD SLIDER

[75] Inventors: Yukio Takeda, Hitachi; Shiro Iijima, Mito; Shinsuke Higuchi, Hitachi; Masaki Ohura; Sadanori Nagaike, both of Odawara, all of Japan

[73] Assignee: Hitachi, Ltd., Tokyo, Japan

[21] Appl. No.: 757,493

[22] Filed: Jul. 22, 1985

[30] Foreign Application Priority Data

Jul. 31, 1984 [JP] Japan .................... 59-161281

[51] Int. Cl.$^4$ .............................................. G11B 5/60
[52] U.S. Cl. .................................... 360/103; 360/122; 428/472; 501/96
[58] Field of Search ................... 360/103, 122; 501/96, 501/98; 428/472

[56] References Cited

U.S. PATENT DOCUMENTS

| 4,251,841 | 2/1981 | Jacobs | 360/103 X |
| 4,430,440 | 2/1984 | Wada et al. | 360/103 X |
| 4,591,537 | 5/1986 | Aldinger | 501/98 X |

Primary Examiner—John H. Wolff
Attorney, Agent, or Firm—Antonelli, Terry & Wands

[57] ABSTRACT

A thin film magnetic head slider is formed of a sintered material made of a mixture of AlN and TiN. The ratio of volume % AlN to TiN in the mixture is in the range of 50:50 to 99:1. The thin film magnetic head slider has improved lubricant property as shown by its high contact-start-stop (C.S.S.) life.

3 Claims, 1 Drawing Figure

THIN FILM MAGNETIC HEAD SLIDER

BACKGROUND OF THE INVENTION

The present invention relates to a thin film magnetic head slider, more particularly, to a magnetic head slider formed of a sintered material exhibiting superior lubricating properties and outstanding wear characteristics.

In the field of magnetic disc files, it is widely known that a thin film magnetic head is employed under such conditions that the head flies over the surface of a magnetic disc. In accordance with the progress of data processing technology, data are stored in the magnetic disc at higher densities; therefore, it is required to use a magnetic head that is kept closer to the surface of the magnetic disc in order to prevent the influence of the neighboring tracks.

A material used to form the thin film magnetic head slider necessarily must satisfy the following conditions:
(1) the material must be stable against chemicals and the heat treatments which are applied during the magnetic head manufacturing process;
(2) the material must not change its form and its characteristics during machining;
(3) the material must provide easy measurement accuracy;
(4) the material must be easy to plane and grind; and
(5) the material must exhibit a superior lubricant property with respect to the magnetic disc.

In order to satisfy these conditions, the material used for forming the thin film magntic head slider should have the following characteristics. The material exhibits a thermal expansion coefficient close to that of other materials used in the magnetic head assembly, a high Young's modulus, a high thermal conductivity, a moderate hardness (one that is not extremely high, preferably under 1500 Kg/mm$^2$ in Vickers hardness number), and a small specific gravity.

A slider material made from mixture of $Al_2O_3$ and TiC is known as a conventional material and is disclosed, for example, in U.S. Pat. No. 4,251,841. This material is good in many respects and is widely used. But this material has some deficiencies, for example, its thermal conductivity is not high and its hardness is too high so that damage may occur by contact between the magnetic head slider and the magnetic disc during prolonged time use. Consequently, this material fails to exhibit sufficient reliability.

SUMMARY OF THE INVENTION

An object of the present invention is to provide a thin film magnetic head slider which exhibits high thermal conductivity, moderate hardness and a superior lubricant property during contact with the magnetic disc.

The present invention is based on the finding that a material made from a mixture of AlN and TiN will satisfy the characteristic that must be exhibits by a thin film magnetic head slider material.

The thin film magnetic head slider according to the present invention is formed of a sintered material made from a mixture of AlN and TiN in which the ratio of the volume % of AlN to TiN is in a range of 50:50 to 99:1.

DETAILED DESCRIPTION OF THE PREFERRED EMBODIMENTS

Figure 1:
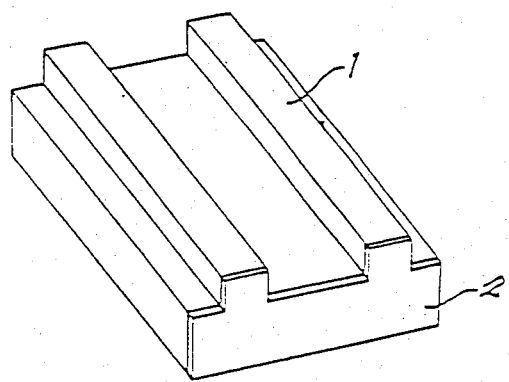
FIG. 1 is a perspective view of a thin film magnetic head slider showing an embodiment according to the present invention.

The thin film magnetic head slider according to the present invention is formed of a sintered material made from a mixture of AlN and TiN wherein the ratio of volume % of AlN to TIN is in the required range; i.e., 50:50 to 99:1. Thus, in accordance with the present invention, it is important to employ 1 to 50% by volume of TiN in the mixture. If the proportion of TiN is less than 1%, the heat expansion coefficient becomes too small so that the transducer adhered on the slider may easily come off from the slider, and if the proportion of TiN is more than 50%, the hardness of the material becomes too high and the thermal conductivity becomes too low so that the life of the thin film magnetic head is short. Therefore, the more preferred range of the ratio of volume % of AlN to TiN is 70:30 to 90:10.

The slider made of the sintered material of the mixture of AlN and TiN according to the present invention has advantages that it is stable against chemicals and heat treatments which are required during the formation of the thin film magnetic head slider element; the thermal expansion coefficient thereof is closer to that of the material used in the magnetic head assembly including thin film transducer; deformation does not occur because the Young's modulus is high; thermal conductivity is high, so it is easy to carry off the heat produced in the thin film magnetic head; the Vickers hardness is not extremely high so it does not harm the magnetic disc in prolonged use; and the specific gravity is small so that the slider can easily fly upon the magnetic disc. Moreover, the lubricant property of the slider material to the magnetic disc is superior to the conventional material.

For performing the sintering under no pressure, it is possible to add 1 to 10% by volume per AlN of at least one of $Y_2O_3$, $Al_2O_3$, BN or BeO to the mixture of AlN and TiN.

EXAMPLE 1

To AlN powder having a purity of 98% and an average particle diameter of 3 μm, TiN powder having a purity of 99% and an average particle diameter of 2 μm were admixed in proportions of TiN of 1, 5, 10, 20, 30, and 50% by volume per total volume of AlN and TiN, respectively. The mixture were, respectively, grounded and mixed for 100 hours by using a ball mill having balls made of same material as the mixtures. After the powder mixtures were formed, they were, respectively, placed in graphite pressing molds and hot-pressed at a temperature of 2000° C. and at a pressure of 30 MPa for one hour in a nitrogen atmosphere (760 Torr) to provide six sintered materials.

The density of the sintered materials obtained from these materials were in a range of 99.7 to 100.6% to the theoretical density calculated based on an assumption that AlN and TiN were mixed in the volume % as stated above. Therefore, it was understood that these sintered materials exhibited very low porosity. Based on the result of observation of fracture surface or mirror-like polished surface of the sintered materials by a scanning type electron microscope, no pore was observed. Further, as the result of X-ray diffraction, the main peaks were the diffraction of AlN and TiN. Therefore, it was understood that the main composition of the sintered materials was the mixture of AlN and TiN.

Table 1 shows the characteristics of these six sintered materials. It is understood that the thermal conductivity of the sintered materials is high; e.g., greater than 20 W/mK. The Vickers hardness number is lower than 1500 kg/mm$^2$. Also, the flexural strengths are 340 to 790 MPa evidencing higher strength.

FIG. 1 shows a thin film magnetic head slider which is formed by using the sintered material. The thin film magnetic head slider comprises a slider body 1 made of the sintered material and a thin film transducer 2. The thin film transducer 2 is formed on the end surface of the slider body 1 and made of multi-layer of magnetic material, electrical conducting material and electrical insulating material.

Table 2 shows the contact-start-stop (C.S.S.) life of the thin film magnetic head slider having the construction shown in the drawings and made of sintered materials of each of the different mixtures tabulated in Table 1. The C.S.S. life was measured by measuring the rotation number of the magnetic disc until a head crash had been occurred at circumferential rotation speed of the magnetic disc of 50 m/s and the C.S.S. life is shown in Table 2 as a ratio to that a magnetic head using conventional Al$_2$O$_3$-TiC material with a value of 1. As it is clear from Table 2, the life of the thin film magnetic heads according to the embodiment of the present invention are 10 to 20 times as long as that of the thin film magnetic head using conventional Al$_2$O$_3$-TiC material.

per the total volume of AlN and TiN, respectively, and Y$_2$O$_3$ powder having a purity of 99.5% and an average particle diameter of 1 μm was admixed in an amount of 3% by volume per the volume of AlN. The mixture were grounded and mixed by the ball mill and the mixture was formed in the same procedures as described in Example 1. Then, the formed material was sintered in the nitrogen gas atmosphere (760 Torr) at a temperature of 1800° C. at normal pressure for one hour. In this Example, by adding Y$_2$O$_3$, it is possible to sinter the mixture of AlN and TiN under no pressure. The density of the sintered materials were in a range of 99.3 to 100.3% to the theoretical density calculated based on an assumption that AlN, TiN and Y$_2$O$_3$ were mixed, respectively, in the volumes stated above; these sintered materials were also pore-less. The characteristics of these sintered materials are shown in Table 3.

TABLE 3

| No. | TiN Added Qty. Vol. % | Thermal Conductivity W/m·K | Thermal Expansion Coefficiency × 10$^{-6}$/°C. | Young's Modulus × 10$^4$ kg/mm$^2$ | Vickers Hardness kg/mm$^2$ | C.S.S. Life | Flexural Strength MPa | Electrical Resistivity Ω cm |
|---|---|---|---|---|---|---|---|---|
| 7 | 1 | 62 | 5.0 | 3.6 | 1300 | 11 | 619 | 9 × 10$^{11}$ |
| 8 | 5 | 61 | 5.2 | 3.8 | 1300 | 14 | 540 | 5 × 10$^8$ |
| 9 | 10 | 57 | 5.5 | 4.1 | 1400 | 15 | 410 | 5 × 10$^2$ |
| 10 | 20 | 50 | 5.8 | 4.3 | 1400 | 18 | 380 | 4 × 10$^{-1}$ |
| 11 | 30 | 46 | 6.2 | 4.7 | 1500 | 20 | 330 | 8 × 10$^{-2}$ |
| 12 | 50 | 31 | 6.7 | 5.2 | 1600 | 10 | 260 | 1 × 10$^{-3}$ |

It will be seen that the thermal conductivity of the sintered materials is high, Vickers hardness number is less than 1600 Kg/mm$^2$ and flexural strength is high. Further, thin film magnetic head sliders were manufactured by using these sintered materials, and C.S.S. life of these magnetic heads were measured by the same method as stated in Example 1. The measured results of the C.S.S. life are also shown in Table 3. It is understood that the life of the thin film magnetic head slider of the sintered material of this example is about 10 to 20 times as long as that of the thin film magnetic head slider made of the conventional Al$_2$O$_3$-TiC material.

The slider material made of sintered material of AlN-TiN according to the present invention satisfies the required reliability as a thin-film magnetic head slider material because thermal conductivity and the strength are high and the hardness is not extremely high. Further, other than the characteristics shown in Tables 1, 2 and 3, the sintered material according to the present invention has been found to be superior in heat resistivity, anti-oxidation, anti-corrosion and anti-chemical properties.

TABLE 1

| No. | TiN Added Qty. Vol. % | Thermal Conductivity W/mK | Thermal Expansion Coefficiency × 10$^{-6}$/°C. | Young's Modulus × 10$^4$ kg/mm$^2$ | Vickers Hardness Number kg/mm$^2$ | Flexural Strength MPa | Electrical Resistivity Ω cm |
|---|---|---|---|---|---|---|---|
| 1 | 1 | 63 | 5.0 | 3.6 | 1300 | 790 | 1 × 10$^{12}$ |
| 2 | 5 | 61 | 5.2 | 3.8 | 1300 | 710 | 3 × 10$^8$ |
| 3 | 10 | 58 | 5.4 | 4.0 | 1300 | 600 | 1 × 10$^2$ |
| 4 | 20 | 52 | 5.8 | 4.3 | 1400 | 480 | 8 × 10$^{-2}$ |
| 5 | 30 | 48 | 6.1 | 4.6 | 1400 | 420 | 3 × 10$^{-3}$ |
| 6 | 50 | 35 | 6.6 | 5.1 | 1500 | 340 | 5 × 10$^{-4}$ |

TABLE 2

| No. | TiN Added Quantity Vol. % | CSS Life |
|---|---|---|
| 1 | 1 | 13 |
| 2 | 5 | 14 |
| 3 | 10 | 15 |
| 4 | 20 | 18 |
| 5 | 30 | 20 |
| 6 | 50 | 10 |
| Al$_2$O$_3$—TiC Ceramics | | 1 |

EXAMPLE 2

AlN powder having a purity of 98% and an average particle diameter of 3 μm, TiN powder having a purity of 99% and an average particle diameter of 2 μm were admixed in proportions of TiN of 1, 5, 10, 20, 30, 50%

What is claimed is:
1. A thin film magnetic head slider, comprising:
a slider body formed of a sintered material comprising a mixture of AlN and TiN;

a thin film transducer disposed on the end surface of said slider body;

said mixture having a ratio of the volume % of AlN to TiN in the range of 50:50 through 99:1.

2. A thin film magnetic head slider as claimed in claim 1, wherein said mixture has a ratio of the volume % of AlN to TiN in the range of 70:30 to 90:10.

3. A thin film magnetic head slider as claimed in claim 1, said mixture further comprises 1 to 10% by volume per the volume % of AlN of at least one of $Y_2O_3$, $Al_2O_3$, BN and BeO.

* * * * *